May 3, 1938.  E. B. BERKOWITZ  2,116,230

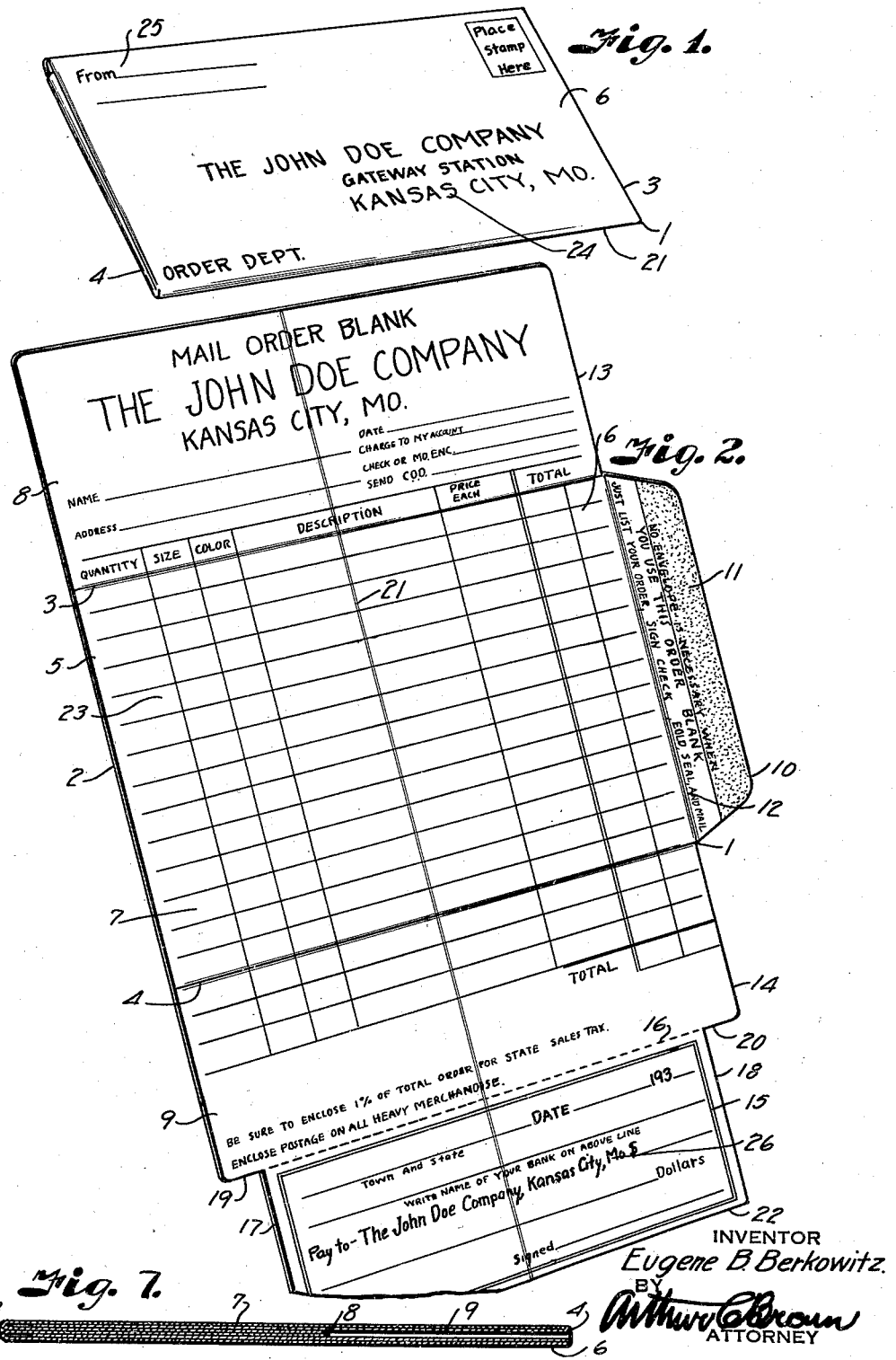

COMBINATION LETTER OR ORDER FORM, CHECK, AND RETURN ENVELOPE

Filed June 13, 1936  2 Sheets-Sheet 2

INVENTOR
Eugene B. Berkowitz
BY
ATTORNEY

Patented May 3, 1938

2,116,230

UNITED STATES PATENT OFFICE 2,116,230

COMBINATION LETTER OR ORDER FORM, CHECK, AND RETURN ENVELOPE

Eugene B. Berkowitz, Kansas City, Mo., assignor to Berkowitz Envelope Company, Kansas City, Mo., a corporation of Delaware Application June 13, 1936, Serial No. 85,116

4 Claims. (Cl. 229—92.1)

This invention relates to a combination order form or letter, check and return envelope formed as a single sheet upon which a customer may enter an order on an order section, fill out a check on a check section and then fold the sheet into an envelope form to a mailing piece to be sent to the person or firm from which the sheet was originally received. In order sheets of this character, as heretofore constructed, the check section has constituted one of the side folds when the sheet is folded to form an envelope, consequently when perforations are employed whereon the check may be severed from the body portion of the sheet, they extend along the fold line at the side of the formed envelope. The perforations are thus exposed to wear so that the check may become accidently torn loose from the envelope or the check may be removed by an unauthorized person upon slitting the fold through the exposed perforations and withdrawing the check from the end of the envelope.

It is, therefore, a principal object of the present invention to provide a mailing piece of this character wherein the check section is folded within and protected by the side folds of the sheet when it is folded into the form of an envelope so as to prevent accidental loss of the check or its removal by an unauthorized person.

Other important objects of the invention are to provide a larger area on which the order form or letter may be printed and yet provide a standard sized envelope when the sheet is folded; to provide a sheet construction wherein the check section may be detached and yet leave the sheet so that it can be folded to form a complete envelope to contain remittances in other forms than the check; and to provide a sheet construction wherein the check is not likely to be torn incidental to opening of the folded form when received by the addressee.

In accomplishing these and other objects of the invention, as hereinafter pointed out, I have provided improved details of structure, the preferred form of which is illustrated in the accompanying drawings, wherein:

Fig. 1 is a perspective view of a combination order form, check and envelope sheet shown in folded condition to form an envelope ready for mailing to the addressee.

Fig. 2 is a perspective view of a sheet in unfolded condition preparatory to filling out of the order and writing the check.

Fig. 3 is a perspective view of the blank showing the first side fold whereby the check section is caused to overlie the body portion of the sheet in spaced relation to the side fold thereof.

Fig. 4 is a similar view showing the other side fold covering the check section and illustrating the beginning of the final fold to complete the form of an envelope.

Fig. 5 is a similar view with the final fold completed and the closure flap ready for sealing.

Fig. 6 is a cross-section through the completely folded sheet showing the closure flap in sealed condition.

Fig. 7 is a longitudinal section through the completely folded sheet showing the enclosure of the check.

Referring more in detail to the drawings:

I designates a combination order form or letter, and check formed as a single sheet and comprising a substantially rectangular shaped portion 2 having transverse score or fold lines 3 and 4 dividing the sheet into a central body section 5 later constituting the front and back flap portions 6 and 7 of an envelope, and side flap portions 8 and 9 when the sheet is folded as later described.

Formed on the central body section 5 and extending along the side edge thereof between the fold lines 3 and 4 is a closure flap 10 having a gum stripe 11 extending along the edge thereof in spaced relation with a score or fold line 12 that extends in alignment with side edges 13 and 14 of the side flap portions of the sheet.

Formed integrally with one of the side flap portions, for example the one designated 9, is a check section 15 which, in the illustrated instance, is separated from the side flap portion by a line of perforations 16. The check section is preferably of shorter length than the width of the rectangular portion 2 of the sheet so that the ends 17 and 18 thereof are spaced inwardly from the side edges of the rectangular section, as at 19 and 20.

The sheet thus described is provided with a longitudinal score or fold line 21 extending entirely across the central body and side flap portions as well as the check section. The distance from the fold line 4 to the lower edge 22 of the check section is preferably less than the distance between the fold lines 3 and 4 so that when the side flap portion, together with the check section, is folded over the central body section 5 as later described, the edge 22 of the check will be spaced from the fold line 3 as illustrated in Fig. 3.

The sheet as above described may be printed in various forms, for example the central body portion, together with the side flap portions, may be printed on the face thereof carrying the seal with an order form as designated at 23, the main portion of the order blank being printed on the face of the central body section and the flap portion 9, while the name and address of the company sending out the order form is printed on the corresponding face of the flap section 8, together with the name and address of the person placing the order as well as the date and other data relating to the order.

The opposite side of the blank which constitutes the front flap portion of an envelope is printed with the name and address of the company, or person sending out the blank, as indicated at 24, and with a space 25 for the return address of the customer, a space being left in the upper right-hand corner for the attachment of a stamp as in customary practice.

The check section 15 is printed on the order side of the sheet in the manner of an ordinary blank check, as indicated at 26.

In using a combination order form or letter, check and envelope constructed as described, the company or person supplies the form as shown in Fig. 2 to the recipient. In case of an order form, the recipient will fill out his order, totaling the amount thereof and filling in the check section of the sheet including his signature. The data on the side flap portion 8 will also be filled in.

When the order form, together with listing of the order and the check section have been filled out, the sheet is folded first by folding the side flap portion 9 together with the check section 15 in flat condition over the front face of the order blank portion so that the edge 22 of the check lies in parallel relation with the fold line 3, as shown in Fig. 3. With this fold, the line of perforations 16 lies substantially near the center of the body portion 5 of the sheet, while the opposite edge of the check is spaced from the fold line 3 forming the opposite side fold of the envelope. The side flap portion 8 is then folded over the check section, as shown in Fig. 4, after which a fold is made along the fold line 21 to bring the back flap portion over the front flap portion as shown in Fig. 5. The sealing flap is then folded on its fold line and sealed to the back flap portion as shown in Fig. 6 to form a complete envelope for secure enclosure of the check.

When the sheet is thus folded it is obvious that the check is completely protected between the side folds so that the line of perforations is not exposed to view. With the sheet thus folded, it is impossible for an unauthorized person to tear through the line of perforations and remove the check without breaking the seal of the closure flap.

When the envelope is received by the addressee it may be readily opened by severing the closure flap along the fold line thereof, as in conventional practice, the space between the sealing gum and the fold line providing adequate clearance for entrance of a letter opener or the like so that the order blank or check are in no way mutilated incidental to opening of the envelope. With the check thus attached it forms an individual part of the order form and avoids confusion which might arise from separation of the check from the order, therefore insuring proper credit being given to the payor of the check.

Should it be desired to remit a money-order, currency or the like, this may be effected for example by placing a bill over the blank check section and then folding the check section together with the bill over the flap 9, after which the flap is folded on the fold line 4 over the body portion of the form. The remaining folds are made in the same manner as above described to complete formation of the envelope. When the bill is thus inserted it is back under the folds so that it is substantially impossible to detect its presence from the exterior of the envelope.

From the foregoing, it is apparent that I have provided a combination order form or letter and check which, when folded, provides for secure enclosure of the check, since it is impossible to remove the check without first breaking the seal of the closure flap.

What I claim and desire to secure by Letters Patent is:

1. A mailing piece comprising a sheet of foldable material having longitudinal and spaced transverse fold lines to divide the sheet into front and back portions and side flap portions on opposite sides of the front and back portions, a check section formed on one of said side flap portions and foldable with said side flap portion inwardly of the mailing piece over said front and back portions to underlie the side flap portion at the opposite side and so that the attaching point of the check section with said side flap portion lies inwardly of the fold line on which said side flap portion is folded, and a sealing flap on said sheet for sealing the front portion with the back portion when the back portion is folded over the front portion on said longitudinal fold line.

2. A mailing piece comprising a sheet of foldable material having longitudinal and spaced transverse fold lines to divide the sheet into front and back portions and side flap portions on opposite sides of the front and back portions, a check section formed on one of said side flap portions and foldable inwardly of the mailing piece with said side flap portion to overlie the front and back portions in spaced relation with said transverse fold lines and to underlie the other side flap portion when said other side flap portion is folded inwardly of the mailing piece on its transverse fold line, and a sealing flap on an edge of the front portion and adapted to sealingly engage with the back portion when the back portion is folded on the longitudinal fold line to form an envelope.

3. A mailing piece comprising a sheet of foldable material having longitudinal and spaced transverse fold lines to divide the sheet into front and back portions and side flap portions on opposite sides of the front and back portions, a check section formed on one of said side flap portions and foldable inwardly of the mailing piece with said side flap portion to overlie the front and back portions in spaced relation with said transverse fold lines and to underlie the other side flap portion when said other side flap portion is folded inwardly of the mailing piece on its transverse fold line, and a sealing flap on an edge of the front portion and adapted to sealingly engage with the back portion when the back portion is folded on the longitudinal fold line to form an envelope, said check section being selectively separable from said side flap portion with the line of separation spaced inwardly from the fold line of the side flap portion on which said check section is formed.

4. A mailing piece comprising a sheet of foldable material having longitudinal and spaced transverse fold lines to divide the sheet into front and back portions and side flap portions on opposite sides of said front and back portions, a check section formed on one of said side flap portions and having its ends spaced inwardly from the ends of said side flap portion, said check section being foldable with said side flap portion inwardly of the mailing piece to overlie the front and back portions and in inwardly spaced relation with said transverse fold lines to underlie the other side flap portion when said other side flap portion is folded on its transverse fold line, and a sealing flap formed on an edge of the front portion and adapted to sealingly engage with the back portion when the back portion is folded on the longitudinal fold line to form an envelope.

EUGENE B. BERKOWITZ.